United States Patent [19]
Wagner et al.

[11] Patent Number: 5,767,843
[45] Date of Patent: Jun. 16, 1998

[54] MANUALLY CONTROLLED IMPUT DEVICE FOR A COMPUTER

[75] Inventors: Dieter Wagner, Vaterstetten; Wolfgang Eisfeld, Unterhaching; Robert Rieger, Tuntenhausen, all of Germany

[73] Assignee: Daimler-Benz Aerospace AG, Germany

[21] Appl. No.: 481,264

[22] PCT Filed: Oct. 29, 1994

[86] PCT No.: PCT/EP94/03521

§ 371 Date: Aug. 25, 1995

§ 102(e) Date: Aug. 25, 1995

[87] PCT Pub. No.: WO95/12862

PCT Pub. Date: May 11, 1995

[30] Foreign Application Priority Data

Oct. 30, 1993 [DE] Germany ............... 43 37 161.2

[51] Int. Cl.[6] ............................................. G09G 3/02
[52] U.S. Cl. ............................................. 345/179; 345/156
[58] Field of Search ............................ 345/156, 157, 345/158, 166, 175, 168, 176, 132, 179–183, 6, 7; 364/707, 709.01; 356/375, 381, 384; 463/32, 37; 178/18, 19

[56] References Cited

U.S. PATENT DOCUMENTS

| | | | |
|---|---|---|---|
| 3,846,826 | 11/1974 | Mueller | 345/180 |
| 4,591,841 | 5/1986 | Gunderson et al. | 345/180 |
| 4,751,503 | 6/1988 | Kermisch | 345/157 |
| 5,049,863 | 9/1991 | Oka | 345/168 |
| 5,063,376 | 11/1991 | Chang | 345/180 |
| 5,325,473 | 6/1994 | Monroe et al. | 345/7 |
| 5,347,620 | 9/1994 | Zimmer | 345/179 |
| 5,401,917 | 3/1995 | Yoshida et al. | 345/179 |
| 5,420,607 | 5/1995 | Miller et al. | 345/179 |
| 5,488,204 | 1/1996 | Mead et al. | 345/179 |

FOREIGN PATENT DOCUMENTS

| | | |
|---|---|---|
| 0 497 598 | 8/1992 | European Pat. Off. |
| 58-076934 | 5/1983 | Japan |
| 03100820 | 4/1991 | Japan |
| WO88/08565 | 11/1988 | WIPO |

*Primary Examiner*—Richard Hjerpe
*Assistant Examiner*—Lun-Yi Lao
*Attorney, Agent, or Firm*—Evenson, McKeown, Edwards & Lenahan, P.L.L.C.

[57] ABSTRACT

The invention relates to a manually controlled input device for a computer which comprises a [graph] graphics card for controlling a monitor video screen [by means of] via a video signal, as a simulation and [in the form] of a mechanical small-size spraying device (air brush) whose operating parameters are composed of three space coordinates, the air pressure of the ink spraying jet and the ink quantity therein. Synchronization signals from the video card are used in conjunction with an optical coupling between the input device and the video screen, to determine the spacial coordinates of the input device relative to the video screen.

7 Claims, 4 Drawing Sheets

5,767,843

MANUALLY CONTROLLED IMPUT DEVICE FOR A COMPUTER

BACKGROUND AND SUMMARY OF THE INVENTION

The invention relates to a manually controlled input device for a computer for interactive control of information displayed on a video monitor.

Mechanical air brushes are known which have five operating parameters, specifically spatial position with respect to the surface to be sprayed in the X-, Y-, and Z-coordinates, as well as air pressure of the spray jet and the amount of ink in the spray jet. The two latter parameters typically are operated by a combined lever which can control both parameters independently of one another. Heretofore, a mechanical air brush could be simulated on the computer and used only by special software; moreover, only a portion of the function of a mechanical air brush can be simulated. That is, the dynamically changeable operating parameters are inputted by a "computer mouse" or a graph tablet, while the other parameters—specifically the static operating parameters—must be set before the use of the air brush function and therefore cannot be changed during processing.

European Patent Document EP 0 497 598 A2, discloses an electronic, manually operated small-size spraying device which may also be considered a mechanical device per se. It has a manual adjusting element for the air pressure to be adjusted and is provided with an air pressure sensor at the current outlet. U.S. Pat. No. 4,751,503, discloses a digital air brush device which can vary the contrast of specific image portions. A dynamic and independent change of all five parameters referred to previously is not possible by means of these two devices, however.

It is an object of the present invention to provide an electronic input device of the type mentioned above, by means of which all five operating parameters available in a mechanical air brush can be changed dynamically and independently of one another during the operation.

This object is achieved by the computer simulated air brush according to the invention, which includes a hand held optical pen type sensor which interfaces with a video monitor and detects scanning signals from the video screen, a first electronic interface for acquiring scanning synchronization data to determine the position of the pen type sensor relative to the video screen surface, and a second electronic interface for controlling the operation of the air brush simulation in response to manipulation of a control lever on the pen type sensor.

Other objects, advantages and novel features of the present invention will become apparent from the following detailed description of the invention when considered in conjunction with the accompanying drawings.

DETAILED DESCRIPTION OF THE DRAWINGS

Figure 1:
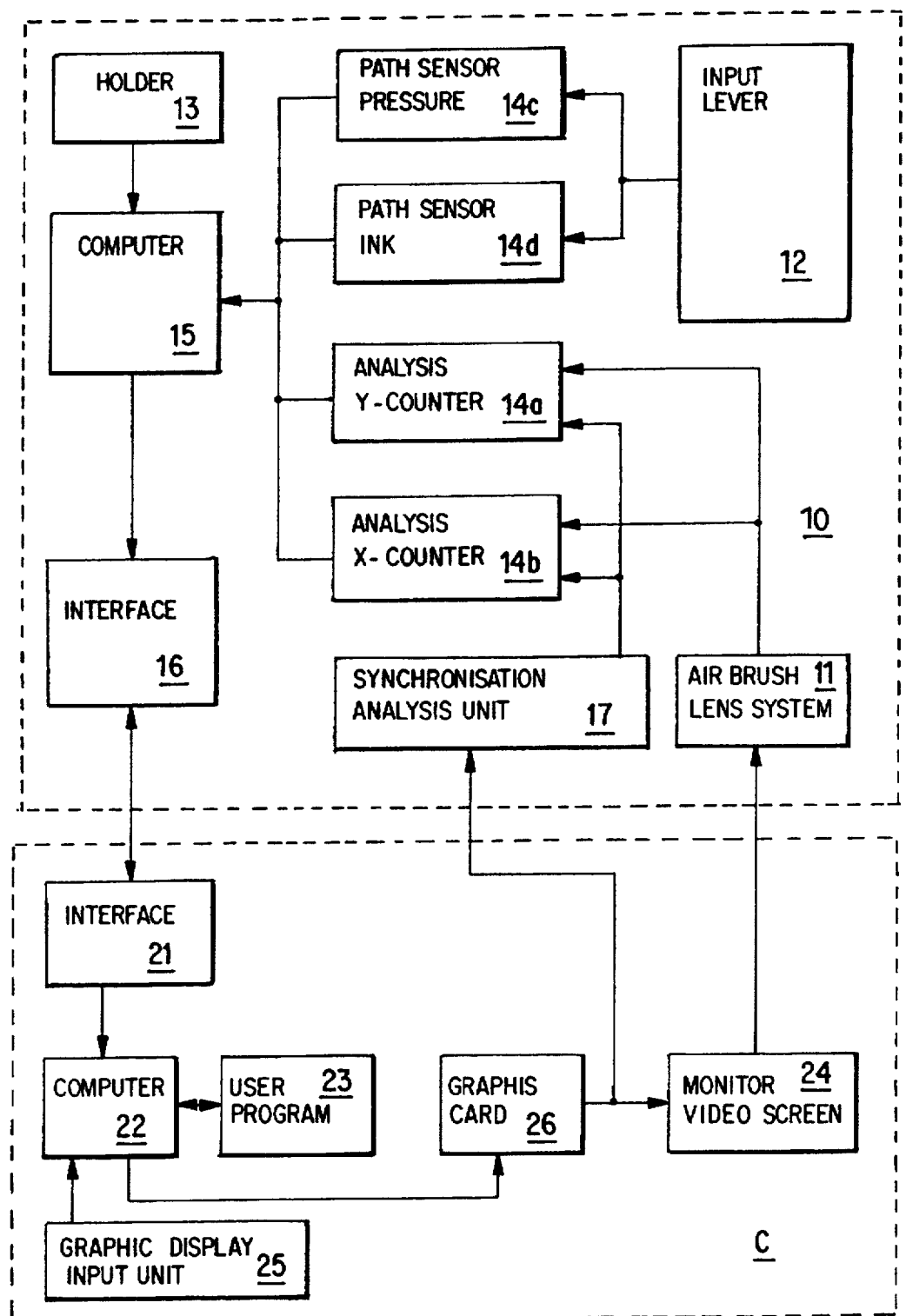
FIG. 1 is block diagram of an embodiment of an electronic air brush connected to a computer system.
Figure 2:
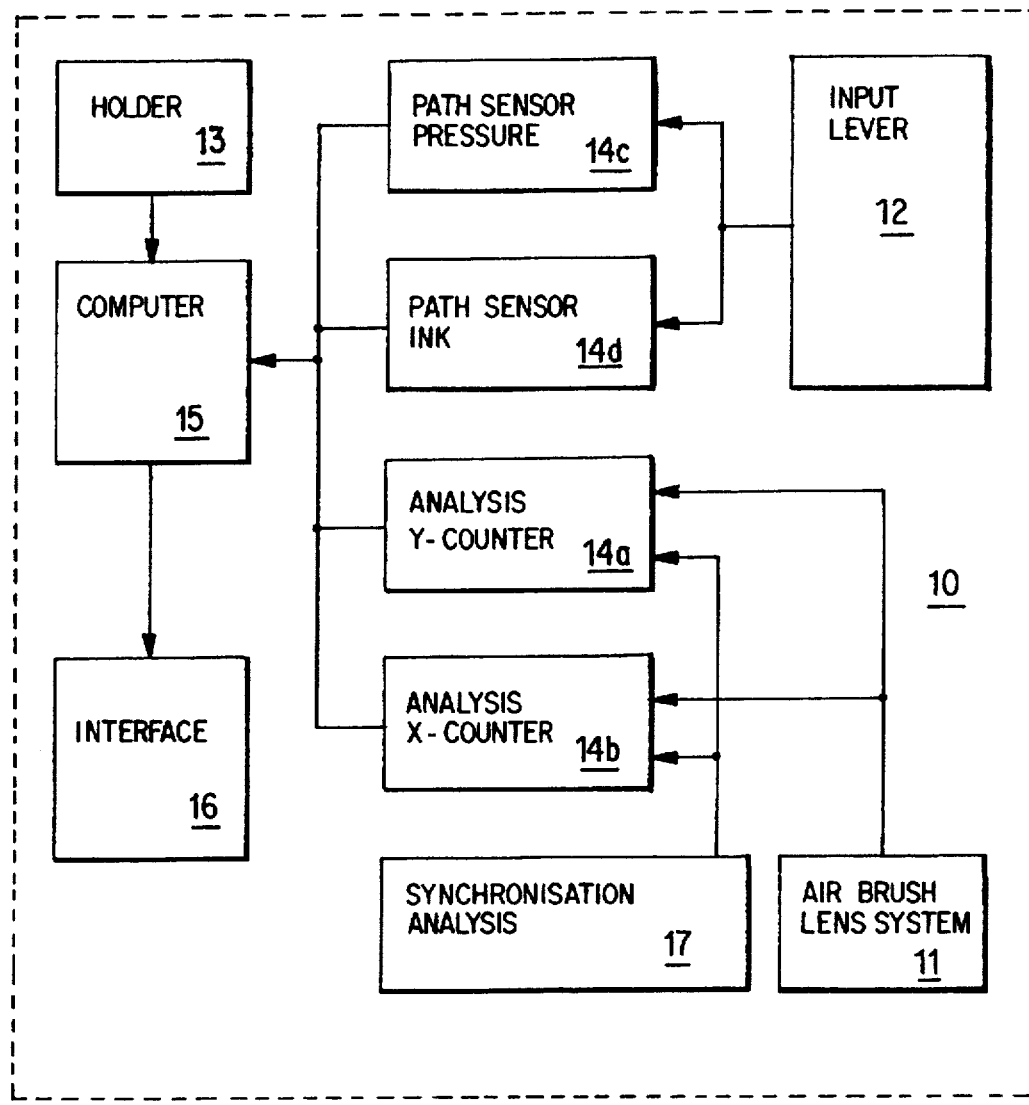
FIG. 2 is a block diagram of the air brush, showing its electronic construction.
Figure 3:
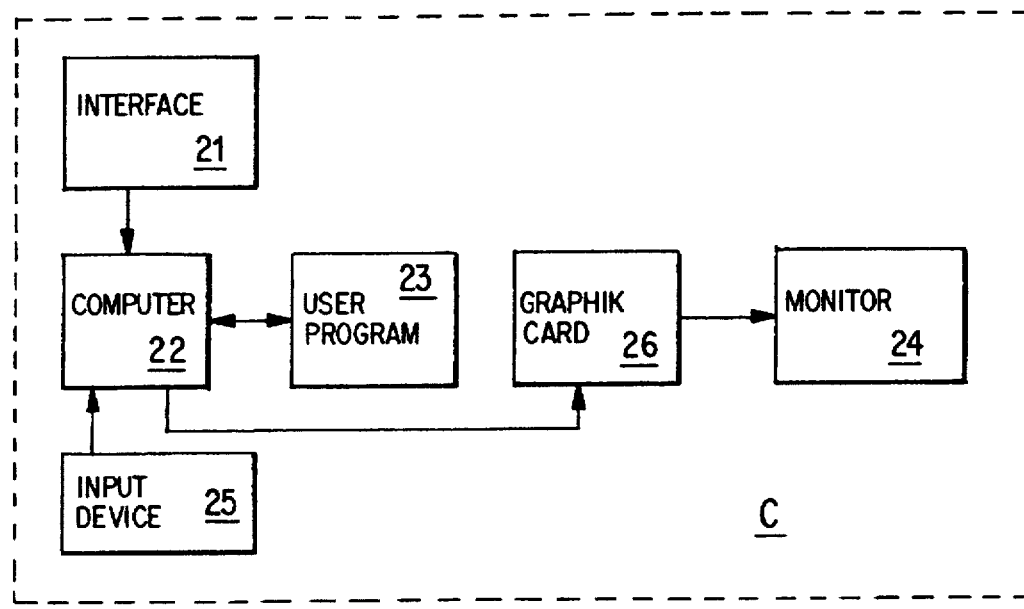
FIG. 3 is a block diagram showing the electronic construction of a computer system suitable for use according to the invention.

As illustrated in FIG. 1, an electronic air brush 10 (shown separately in FIG. 2) is connected with a computer system C (illustrated separately in FIG. 3), by way of three interfaces, specifically the interface 16, 21 between processing units 15 and 21, the connection of synchronization analysis unit 17 of the air brush 10 with the electronic module for the graphics card 26 of the computer C, and the coupling between monitor 24 and the air brush lens system 11 of the air brush 10. By optically sensing the scanning lines on computer monitor 24 by means of the air brush lens system 11, the system determines the coordinates of the air brush 10 relative to the computer monitor video screen 24. The latter connection therefore takes place optically. To determine the absolute coordinates, the air brush 10 is connected with the video signal of the computer graphics card 26 by way of the video synchronization analysis unit 17. This second connection therefore takes place physically (electrically). The computed coordinates and the air pressure and ink quantity values of the input lever 12 are transmitted by way of the interface 16 to the interface 21 of the computer C. The first connection therefore also takes place physically.

A computer C which is suitable for use with an electronic air brush 10 is composed of the following modules or systems: A processor 22, a user program 23, a graphics card 26 with a connected computer monitor video screen 24, and finally the graphic display input device 25 with the air brush 10 itself. (See FIG. 3.) For the processing of images by means of the user program 23, different tools are available to the user. One of these tools is, for example, an air brush application which has the purpose of spraying portions of images, which are partially covered by masks, with an ink so that a certain desirable effect is achieved.

The embodiment described hereinafter relates specifically to user programs 23 which are used for graphic alteration of images. When a user activates the air brush tool in the program 23, a specific subprogram is called which establishes communication with the air brush 10 and performs the alteration of the image based on the air brush data. In this mode, the previous function of the computer mouse or of the graphics card or similar input devices is completely replaced by the air brush.

The user removes the air brush from the holder 13, whereby it is automatically activated. When it is now held in front of the computer monitor video screen, the air brush lens system 11 detects the illumination image dots of the computer monitor 24 which are made luminous by the deflected electron beam of the image tube. By means of the synchronization signals from the synchronization analysis unit 17, which are taken from the video signal, the computer 15 calculates the position of the center point of the image of the air brush lens system 11 on the computer monitor video screen 24 or its surface. The sensing of the image dots by the lens system 11 thus determines the position x,y, while distance z of the air brush 10 with respect to the computer monitor 24 is determined by the number of scan lines detected within the field of view of the lens system, as described in detail hereinafter.

Figure 4:
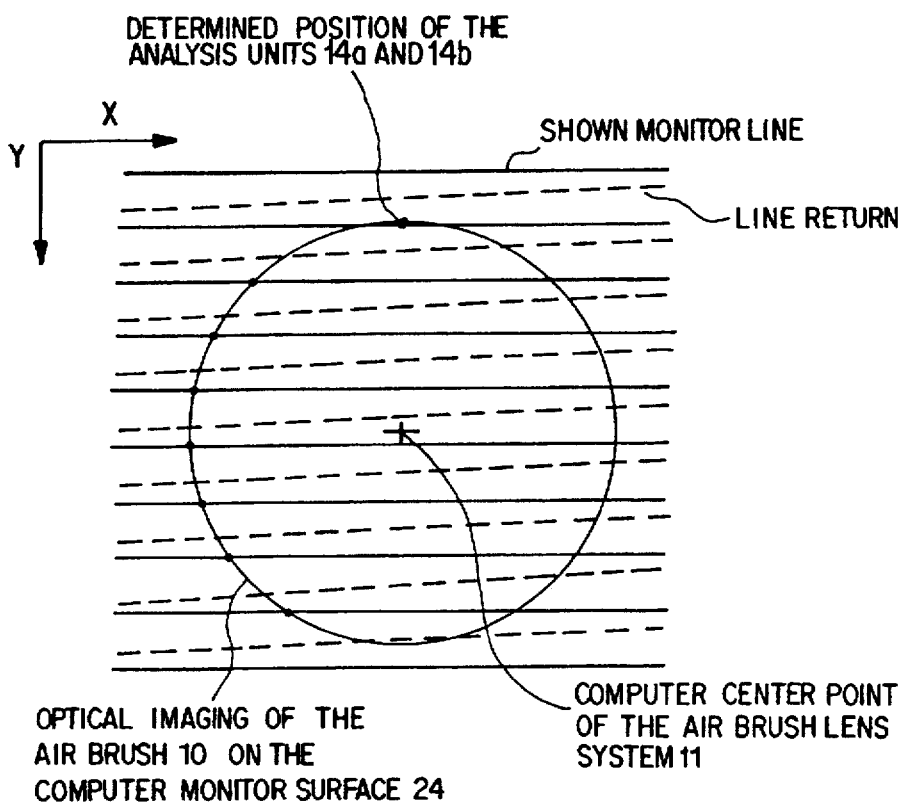
FIG. 4 is a graphic depiction of scanning of the monitor surface by the air brush.
Figure 5:
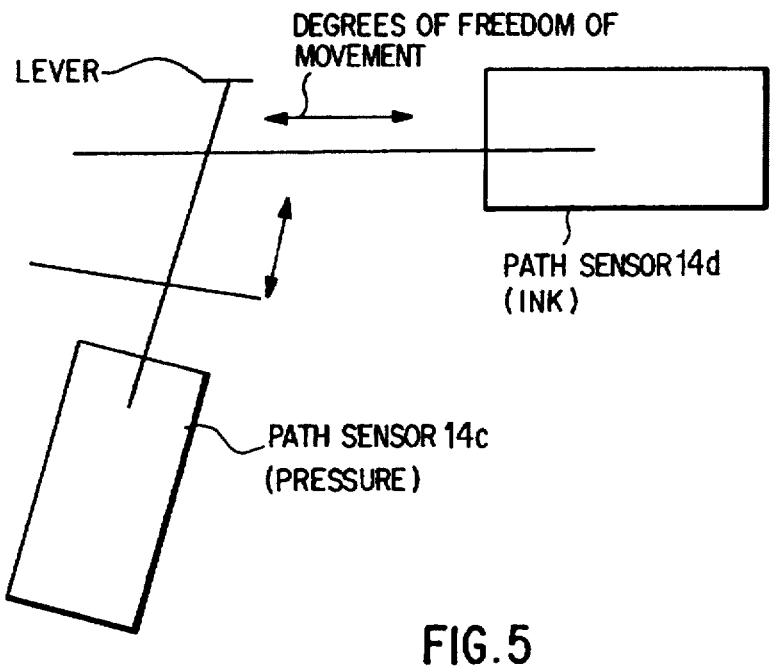
FIG. 5 is a schematic representation of the lever function of an air brush, with an indication of the degrees of freedom of movement.

The determined coordinates (x,y,z) are transmitted by way of interfaces 16 and 21 to the computer 22, and thus to the user program 23. This program draws a marking cross at point x,y which corresponds to the position of the air brush 10 on the video screen 24, as an acknowledgement for the user. The distance z of the air brush 10 from the computer monitor 24 is represented by the circle around the marking cross, based on to the imaging of the air brush lens system 11. (See FIGS. 4 and 6.) When the user now operates the combined input lever 12, (FIG. 1), which has two degrees of freedom as shown in FIG. 5, the pressure and ink quantity data corresponding to the lever position values are transmitted to the user program 23. As a result, the electronic unit for the user program 23 causes the graphics card 26 to enter on the video screen 24, a graphic representation of the deposit of ink, according to the air pressure and ink quantity parameters input via the lever 12, in the image area defined by the position coordinates x, y and z as described above.

If, during the operation of the input lever 12 or levers 12, the air brush 10 is moved relative to the video screen, or the lever position is changed, the user program 23 is immediately informed of the new coordinates or the lever position values. Corresponding to the arriving data, the electronic unit for this program 23 enters the ink into the image to be processed and updates the marking.

When the desired ink application is terminated and the user deposits the air brush 10 back on the holder 13, the air brush is deactivated, the air brush subprogram is exited and the control is returned to the computer mouse or the graphic display input unit 25 for the normal further processing of the user program 23.

As mentioned above, the coordinates representing the position of the air brush 10 relative to the computer monitor video screen 24 are determined from the imaging of the air brush lens system 11. The horizontal synchronization pulse (H sync pulse) for every line and the vertical synchronization pulse (V sync pulse) for every image are detected by the synchronization analysis unit 17, from the video signal generated by the graphics card 26. The y-counter 14a (FIG. 1), which determines the y-coordinate, is set back in response to the V snyc pulse, and the count stored therein is increased by 1 in response to each H-snyc pulse. If, in line n, an image dot which is to be processed is determined by the air brush lens system 11, the current count of the y-counter 14a is stored in the computer 15.

The x-counter 14b, which determines the x-coordinate, is set back by each H sync pulse, and the count is incremented at fixed time intervals. If, in the detection range of the air brush lens system 11 in the current line n, an image dot to be processed is detected, the x-counter 14b is stopped, and at the end of the line it is read by the computer 15, and the count is stored. At the end of an image, the computer 15 computes the center point of the imaging from the distribution of the stored x- and y-counts. (See FIG. 4.)

From the number of lines, which are detected by the air brush lens system 11 within its field of view, a conclusion can be drawn concerning the distance z of the lens system 11 from the computer monitor surface 24. That is, the distance z is proportional to the number of detected lines.

To determine the air pressure and ink quantity, respective path sensors 14c, 14d are connected to the corresponding input lever 12 with its combined functions. Pressing (or releasing) the input lever 12, changes the output signal of the path sensor 14c, which is analyzed and inputted into the computer 15. The magnitude of the air pressure is determined by the output signal of the path sensor 14c, which in turn is proportional to the extent to which the lever 12 is depressed. The same principle is used to determine the amount of ink. That is, pulling or releasing of the input lever 12 (as shown in FIG. 5), changes the output signal of the path sensor 14d, which is analyzed and transferred to the computer. The quantity of ink is determined by the output signal of the path sensor 14d, which is proportional to the adjusting path of the lever 12.

FIG. 5 is a schematic representation of the functions of the input lever 12, which has two "degrees of freedom", or directions of movement, represented by arrows. Movement of the lever downward and upward in the Figure, which corresponds to depressing and releasing the lever on the air brush, is detected by the path sensor 14c to control the air pressure as noted above. Movement of the lever from left to right in the Figure, which corresponds to longitudinal movement of the lever on the air brush, is detected by the path sensor 14d to control the ink quantity.

Figure 6:
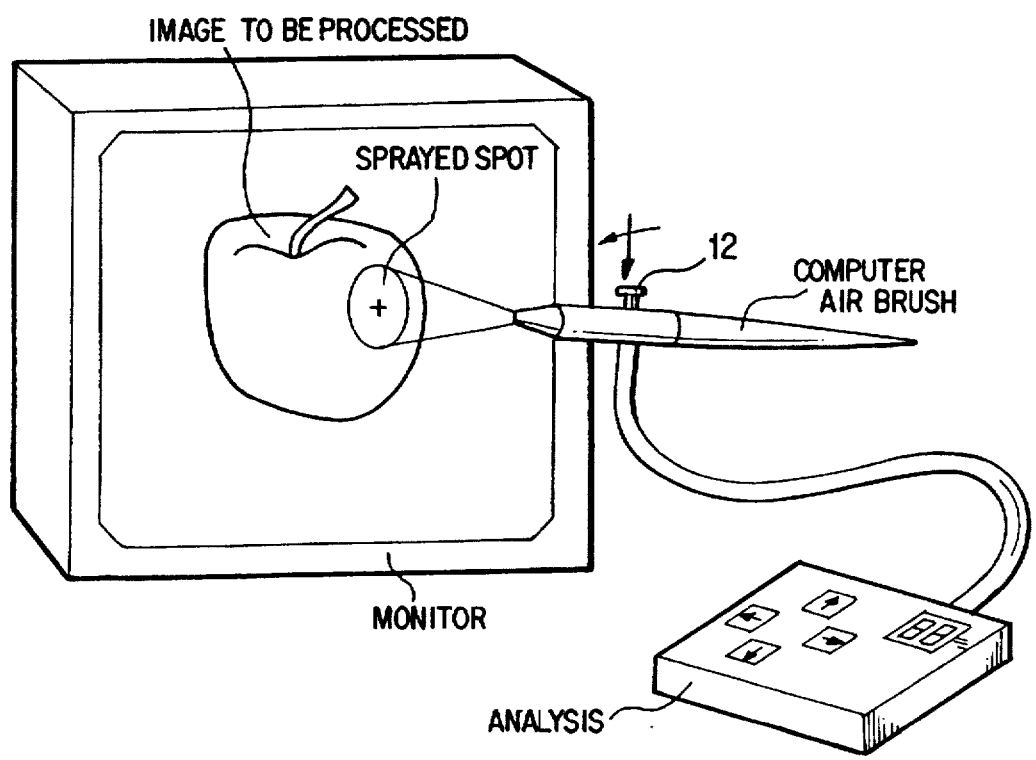
FIG. 6 is a perspective view of an electronic air brush during the processing of a monitor image.

FIG. 6 is a perspective view of a significantly simplified system according to the invention, and illustrates its method of operation to the person skilled in the art. As illustrated in this Figure, the invention provides an electronic simulation of an air brush that no longer requires compressed air, ink and paper for its operation. It is therefore environmentally friendly in that it has no harmful effect on the health caused by ink spraying fog; it no longer requires compressors; and its handling is significantly simplified and also much faster.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Manually controlled input apparatus for simulating a mechanical hand held ink spraying device, by means of a computer having a graphics card which generates a video signal for controlling a video screen, simulated operating parameters of said ink spraying device comprising three spatial coordinates, air pressure of the ink spraying device and ink quantity, said apparatus comprising:

an optical interface for coupling said input apparatus to said computer, said optical interface comprising an optical sensor for optically scanning said video screen;

a first electronic interface connecting a synchronization analysis unit of the ink spraying device of the input apparatus with the video signal output from said graphics card of the computer;

means for determining three dimensional position information for said input apparatus based on information received from said optical interface and said first electronic interface;

a second electronic interface coupling said input apparatus and said computer for communicating said three dimensional position information and information concerning said air pressure and said ink quantity between said input apparatus and said computer;

whereby all of the operating parameters of said ink spraying device can be dynamically varied, and changes in said operating parameters can be detected by means of electronic components directly at the input apparatus.

2. Manually controlled input apparatus according to claim 1 wherein said spatial coordinates can be determined by way of the optical interface and the first electronic interface.

3. Manually controlled input apparatus according to claim 2 wherein the optical sensor senses image dots on the video screen and generates a signal in response thereto which is proportional to distance of the input device from the video screen and from which the position x,y of the input device relative to the monitor video screen can be determined by the analysis of a synchronization signal of the video signal of the graphics card.

4. Manually controlled input apparatus according to claim 1 wherein the operating parameters "air pressure" and "ink quantity" can be adjusted by means of an input lever corresponding to the input lever of the mechanical hand held ink spraying device in that an output signal of a path sensor connected to the input lever, which is in each case proportional to a push-in depth, determines the respective operating parameters.

5. Manually controlled input apparatus according to claim 1 further comprising means for automatically activating said input apparatus when said optical sensor is removed from a holder.

6. Manually controlled input apparatus according to claim 1 wherein for analysis of the operating parameters, a user program of the computer is assigned to it which contains additional electronic tools for graphic changing of images or for the communication with subprograms.

7. A manually controlled apparatus for simulating a mechanical hand held ink spraying device by means of a computer having a computer graphics card which generates a video signal for controlling a video screen, said apparatus comprising:

a manually controlled input unit which is displaceable in three dimensions relative to said video screen;

said input unit having manually operable control element which can be manipulated with two degrees of freedom to generate control signals corresponding to an ink quantity and an air pressure of said ink spraying device;

an optical interface for coupling said input unit to said computer, said optical interface comprising an optical sensor on said input unit for optically scanning said video screen;

a first electronic interface connecting a synchronization analysis unit of the input unit with a video signal output from said graphics card;

means for determining three dimensional position information for said input unit based on information received from said optical interface and said first electronic interface;

a second electronic interface coupling said input unit to said computer for communicating said three dimensional position information and said control signals between said input unit and said computer;

means for modifying an image of said video screen based on said three dimensional position information and said status of said two degrees of freedom.

* * * * *